Patented Nov. 24, 1953

2,660,573

UNITED STATES PATENT OFFICE 2,660,573

SYNTHETIC RESIN AND METHOD OF MAKING THE SAME FROM FURACROLEIN, FURFURAL, AND FORMALDEHYDE

Willard J. Lantz, Emmaus, and Joseph M. Walters, Allentown, Pa., assignors to Electro-Chemical Engineering & Mfg. Co., Emmaus, Pa., a corporation of Delaware No Drawing. Application March 29, 1951, Serial No. 218,287

15 Claims. (Cl. 260—67)

The present invention relates to a novel synthetic resin, specifically a novel furan resin, and to the method of making the same; and more particularly, the invention relates to a novel furan resin that is capable of being converted to the final, infusible, insoluble state at moderate temperatures and in the presence of alkaline material.

There is a wide variety of synthetic resins available each having characteristic properties making it of utility in a particular field. Among these are synthetic resins which are capable of being converted into the final, infusible, insoluble state at moderate temperatures, for example, normal atmospheric temperatures, within a relatively short time. Such resins are of particular utility, in limited environments, as cements, coating materials, impregnants, and the like.

However, the resins of the latter type, particularly those employed in "acid-proof" cements, coatings, impregnants, and the like, all require acid conditions in which to be converted to the final insoluble, infusible state, and this fact seriously limits their applicability. Thus such acid-catalyzed resins, although they are acid-resistant when converted to the insoluble, infusible state, cannot be applied to materials which are reactive with acids. For example, such a resin cannot be applied directly to metal or to concrete, asbestos, magnesia blocks, or other alkaline surfaces, for example, as a coating material or as a cement. In such cases the metal or the alkaline materials react with the acid catalyst in the resin preventing satisfactory adhesion and setting of the resin, particularly in the neighborhood of the interface between the resin and the surface. Hence, with such resins a primer coat, usually consisting of a thermoplastic resin or a rubber dissolved in a solvent, is necessary in order to obtain any degree of adhesion to such surfaces, and to obtain proper setting. In addition, the type of filler materials used with such resins is limited to those which are free of substances reactable with acid. For instance, with such resins, asbestos can be used as filler only after treatment with acid to remove alkaline materials therefrom. Of course, powdered metals and filling materials of alkaline nature such as Portland cement, magnesia, lime, and the like, cannot be used.

A further limitation of prior thermosetting resins, is the fact that they will not bond to surfaces in the presence of, or under, water. A resin that could be converted to the final, infusible, insoluble state and develop adhesion while immersed in water would find a wide number of valuable uses.

It is the principal object of the present invention to provide a novel resin convertible to the infusible, insoluble state and possessing valuable novel properties.

Another object of the invention is to provide a novel resin which is convertible to the infusible, insoluble state under alkaline conditions and which, therefore, can be used in connection with materials that are reactable with acids.

Still another object of the present invention is to provide a novel resin which is convertible to the infusible, insoluble state at moderate temperatures under alkaline conditions, and hence, which is of high utility as a cement, coating material, impregnant, binder, and the like, in connection with materials reactive with acid in situations where the use of heat to cause conversion of the resin is not desirable.

A further object of the present invention is to provide a novel resin which is convertible to the infusible, insoluble state, under alkaline conditions, and hence, which may have incorporated therein, fillers comprising metals or alkaline materials.

A further object of the present invention is to provide a novel resin which is convertible to the insoluble, infusible state in which state it is resistant to the action of acid, alkali and most solvents.

A further object of the present invention is to provide a novel resin which will bond to surfaces and is convertible to the insoluble, infusible state in the presence of, or under, water.

Other objects will be apparent from a consideration of the following specification and the claims.

The novel resin of the present invention is a condensation product of furacrolein, furfural and formaldehyde, and is prepared by condensing furacrolein, furfural and formaldehyde in an acid aqueous medium.

Furacrolein is an unsaturated furyl aldehyde or furyl alkenal, specifically furyl propenal, and may be prepared by reacting one mol of furfural with one mol of acetaldehyde. In practice it is usually desirable to provide an excess of acetaldehyde in the reaction medium, such as an excess of about 0.5 mol per mol of furfural. The reaction is carried out in an aqueous medium under alkaline conditions. Mixing of the reactants together in the reaction medium is generally sufficient to carry out the reaction. The reaction is exothermic, and in some cases, such as to avoid undue loss of acetaldehyde, cooling means may be employed if desired. The resulting product is an aqueous slurry, the non-aqueous components of which may range from about 75 to about 95% furacrolein, some unreacted furfural and acetaldehyde, and higher homologues of furacrolein. This "crude" furacrolein may be employed in accordance with the present invention, or the crude product may be further treated, as by steam distillation, to provide a more pure furacrolein product. With respect to the broader aspects of the present invention it is relatively immaterial whether, in preparing the resin of the invention, the crude furacrolein or pure furacrolein is employed. It has been found, however, that the resin prepared using pure furacrolein is more reactive than is the resin prepared from the crude furacrolein, and this property may be advantageous in certain applications of the present product. It has been found in practice, however, that for general purposes the differences in properties between the resin prepared from the crude furacrolein and the resin prepared from pure furacrolein, are not such as to warrant the expenditure of time and labor in the purification of the furacrolein. Herein and in the claims where reference is made to furacrolein it will be understood to include, unless the term is otherwise modified, the crude product as well as pure, or substantially pure, furacrolein.

As stated, the novel resin of the present invention is prepared by reacting furacrolein, formaldehyde and furfural. As is well known there are several materials available which serve as sources of formaldehyde in resin manufacture, such as the commercial 37% solution of formaldehyde in water known as formalin, paraformaldehyde and hexamethylene tetramine. Any of these materials may be employed, since in the reaction medium they supply formaldehyde for reaction. As is the usual case in resin manufacture, the commercial 37% formaldehyde solution is the preferred source of that compound.

The relative proportions of the furacrolein, formaldehyde and furfural may vary somewhat in order to provide the convertible resin of the invention. Thus the molar ratio of the furacrolein to the furfural may be as high as about 10 mols of the former per mol of the latter, a mol ratio of furacrolein to furfural of less than about 7 to 1 being preferred. The mol ratio of furacrolein to furfural will generally be over 1 to 1, generally at least about 1.5 to 1. Preferably the mol ratio of furacrolein to furfural will be at least about 1.6 to 1. Particularly valuable resins are provided when the mol ratio of furacrolein to furfural is between about 2 to 1 and about 3 to 1.

With respect to the formaldehyde the amount thereof employed will generally not be less than that which provides a mol ratio of furacrolein plus furfural to formaldehyde of about 1.6 to 1, and the amount of formaldehyde may be increased to provide a mol ratio of furacrolein plus furfural to formaldehyde of as low as about 0.5 to 1. Preferably the mol ratio of furacrolein plus furfural to formaldehyde is between about 0.6 to 1 and about 1.4 to 1, particularly valuable resins being provided where the mol ratio of furacrolein plus furfural to formaldehyde is between about 0.8 to 1 and 1 to 1.

The reaction as stated will be carried out in an aqueous medium, and the amount of water employed is not critical so long as at least sufficient water is present to provide a fluid slurry of the furacrolein, which is substantially water-insoluble, and the other reactants.

As also stated above, the reaction will be carried out under acid conditions. While any pH on the acid side of neutrality may be employed, the reaction proceeds at the most favorable rate at relatively low pH's, that is at pH's below about 4, and even down to where the pH approaches 0. However, for practical purposes, the pH of the reaction medium is preferably between about 1 and about 3. The desired acid conditions may be provided by any acidic material, such as acids or acid salts, the stronger acids such as hydrochloric acid, phosphoric acid, paratoluene sulfonic acid, and the like being preferred, although weaker acids such as oxalic acid, acetic acid, and the like, may be used if desired. Examples of acid salts that may be used are ferric chloride, stannic chloride, and the like.

The reaction is exothermic in nature and will take place at elevated temperatures. The reaction may be initiated by warming the reaction mixture, for example, to at least about 160° F., whereupon the reaction commences. The liberated heat results in the reaction being self-sustaining, and within a short time the temperature of the reacting mixture will reach its boiling point which is in the neighborhood of about 204° F. at atmospheric pressure. While temperatures above this figure, such as temperatures as high as about 250° F. may be used, where pressure is employed, no advantage is gained by doing so. By using vacuum the boiling point of the mixture may be maintained below the above figure, and by using cooling means the temperature may be maintained below the boiling point during the course of the reaction. However, in any case the temperature of the mixture is maintained at at least about 160° F., more generally at least about 180° F. Preferably the reaction mixture is maintained in the boiling state at a temperature above about 200° F., refluxing under atmospheric conditions being particularly advantageous.

The reaction is accompanied by the liberation of water indicating that the formation of the initial resin is the result of condensation among the reactants. To provide intimate contact of the reactants, agitation of the reaction mixture at least during the major portion of the reaction is resorted to. While boiling of the reaction mixture may provide sufficient agitation, it is preferred to provide mechanical agitating means.

As the reaction proceeds, the resin forms as a separate phase substantially immiscible with the water phase which, in the absence of agitation, will sink to the bottom of the reaction mixture forming a separate layer. The furacrolein, at the temperatures employed, is more miscible with the resin phase than with the aqueous phase and, therefore, unreacted furacrolein becomes associated with the resin phase during the reaction. An indication as to when substantially all of the furacrolein has entered into the resin-forming reaction, and thus the minimum point at which the reaction may be arrested, is given at the point where no significant sludge (furacrolein crystals) forms in a sample of the resin when cooled to 30° F. At this point the resin formed is in the early stages of polymerization and has a relatively low viscosity. The reaction may be arrested at this point or it may be permitted to proceed somewhat further, preferably at least until the viscosity of the resin layer reaches about 50 centipoises when measured at 77° F.

The reaction may be continued further and arrested at any time while the resin is still liquid. Generally, however, the reaction will be arrested before the viscosity of the resin layer reaches about 5000 centipoises when measured at 77° F., and preferably the reaction is arrested before the viscosity reaches about 700 centipoises when measured at 77° F.

The reaction may be arrested by various means known in the resin-making art. For example, by cooling the reaction mixture to below about 120° F., the reaction will cease. However, a preferred method of arresting the reaction at the desired point when relatively low pH's are employed during the reaction, is by removing acid to raise the pH of the resin to a level where it is least reactive. This pH has been found to be between about 4.5 and about 5.5. To so raise the pH of the resin to this level, the resin may be washed once or a plurality of times with water to remove acid. However, it is preferred to remove acid to raise the pH by the addition of alkaline material. A particularly advantageous method of raising the pH by the use of alkaline material is to add, to the aqueous layer above the resin layer, alkaline material in an amount on the order of that theoretically required to substantially neutralize the acid employed during the reaction. It has been found that by such an addition of alkaline material to the aqueous layer the pH of the resin will rise to the stated level.

Regardless of how the reaction is arrested, it is generally desirable to remove the aqueous layer from the resin layer, and this may be accomplished in any manner known to those in the resin art, such as distillation, decantation, and the like.

The resin is a dark brown liquid, which, at a pH between about 4.5 and about 5.5 is relatively stable; that is, although it can be converted to the final infusible stage upon prolonged heating, it will not thicken substantially over a period of several months when stored at ordinary temperatures. At pH's below about 4.5 the reactivity of the resin increases until at relatively low pH's, as discussed more in detail hereinafter, the resin will be converted to the final, infusible, insoluble stage in a relatively short time. Thus, in the event the reaction is arrested by means other than the removal of acid, the resin may be employed as such reliance being placed on the residual acid therein to effect conversion of the resin to the final, infusible, insoluble state. It is the preferred practice, however, particularly from the standpoint of storing and/or marketing the resin, to adjust the pH thereof to the above-stated level where it is relatively stable. The relatively stable resin can then be handled as desired, a conversion catalyst being added subsequently prior to use as discussed more in detail hereinafter.

As has been stated previously, the resin prepared from pure furacrolein is more reactive than that prepared from the crude furacrolein. It has been found, however, that if the resin prepared using the crude furacrolein is heated whereby water and unreacted materials are removed, the resinous product is similar to that prepared using pure furacrolein. Thus, in the event the crude furacrolein is employed in the reaction, the resulting resin, after adjustment of the pH to the stated level for maximum stability, may be heated until it is substantially free of volatile contaminants. Preferably this heating is caried out under vacuum, such as at a vacuum of between about 25 mm. and about 100 mm. of mercury. The average temperatures employed during his heating step will, of course, depend upon the degree of vacuum, if any, employed and may range from as low as about 72° F. where high vacuum is employed up to about 385° F. where no vacuum is employed.

The resin prepared as described, as stated is relatively stable at pH's between about 4.5 and about 5.5. As also stated above, the resin, at pH's lower than about 4.5 is less stable and is more readily converted into the final, insoluble, infusible state. Thus, upon the addition of acid to the stable resin a product will be provided that will be converted into the final, infusible, insoluble state at least upon the application of heat. The resin produced using pure furacrolein, and the resins produced using crude furaorclein but from which the volatile contaminants have been removed as discussed above, are more reactive under acid conditions than the resin produced using the crude furacrolein without subsequent treatment to remove volatile contaminants, and these resins will convert to the final, insoluble, infusible stage, at relatively low pH's, even at moderate temperatures. The resin produced using the crude furacrolein without subsequent removal of volatile contaminants, may require heating, in order to be converted at relatively low pH's. In any event when it is desired to convert the resin under acid conditions, acidic material to provide a pH of below about 4, preferably below about 2, may be added. Any acid material capable of providing such a pH may be used, such as those mentioned previously in connection with the preparation of the resin.

A primary feature of the resin of the present invention is that it is readily converted to the final, insoluble, infusible state, at moderate temperatures, such as room temperature or atmospheric temperatures, under alkaline conditions, that is, when an alkaline material is incorporated therein. Any pH on the alkaline side of the neutral range, that is a pH above about 8, is sufficient for satisfactory conversion of the resin, and the pH of the resin may be any figure above that, even to where it approaches a pH of 14. Preferably, however, the pH of the resin, upon addition of the alkaline material will be between about 9 and about 11. Any alkaline material to provide the desired pH may be employed, such as the alkaline earth metal oxides or hydroxides such as quick lime, hydrated lime, magnesia, and the like; the alkali metal hydroxides, such as sodium hydroxide, potassium hydroxide, and the like; ammonium hydroxide; amines, such as diethylenetriamine, dipropyltriamine, ethylenediamine, and the like. Mixtures of alkaline materials may be used. As will be pointed out hereinafter, fillers may be incorporated in the resin and the filler may be of an alkaline nature to supply some or all of the alkalinity desired.

The catalyst, whether acid or alkaline, may be added to the resin as such or dissolved or dispersed in a suitable liquid, particularly a liquid miscible with the resin, such as ethanol, carbon tetrachloride, acetone, tetrahydrofuran, and the like. In view of the progressive increase in reactivity of the resin at pH's progressively higher and lower than the relatively stable level, the desired working life will be taken into consideration when the catalyst is added to the resin. Thus, for example, a cement prepared from a resin produced using pure furacrolein, a filler, a plasticizer and an alkaline material to provide a pH of about 10 has a useful working life of about ½ hour, and will be completely converted to the insoluble, infusible, stage at 70° F. in about 48 hours.

The resin may be employed in a wide variety of applications upon the incorporation therein of alkaline or acid materials to accelerate conversion thereof to the insoluble, infusible state. For instance, the resin may be used as an impregnant for porous materials, such as concrete, paper, textile fabric, cloth fabric, asbestos sheeting, mineral and glass wool products, and the like, or as a coating or adhesive, for laminating purposes or otherwise. By incorporating in the resin an alkaline catalyst, the resin can advantageously be used in connection with materials such as metals, concrete structures, asbestos, magnesia blocks, and the like, which are reactable with acids. Moreover, by incorporating an alkaline catalyst in the resin the resin can have mixed therewith fillers that would ordinarily be reactable with acid, such as fillers containing alkaline materials or metals. In this latter connection, the alkali-catalyzed resin of the invention may advantageously be used as a binder for powdered metals in the preparation of bodies having electrical conductivity properties or for use as patching compositions for metal castings, and the like. It has been found that the resin of the invention, catalyzed either with acid or alkali, will develop adhesion to surfaces and will convert to the final, infusible, insoluble state in the presence of, and under, water. Such property is particularly valuable in, for example, the repair of sewer pipe joints and other structures where water is present.

Various materials may be added to the resin to modify its physical properties and thus to extend its field of use. For example, a plasticizer may be incorporated in the resin to render it more flexible and more adhesive, to impart higher impact resistance or to reduce shrinkage. Plasticizers, as is well known, are organic materials, either liquid or solid, which are soluble in the resin and which enter into the resin structure to modify its physical properties in the manner stated above. Examples of plasticizers which are of particular utility in connection with the resin of the present invention are thermoplastic resins, such as polyvinyl formal, polyisobutyl methacrylate, and the like; high boiling liquids such as tricresylphosphate, polyisobutylene, glycerin, the glycols, chlorinated diphenyls, particularly those having a viscosity of 42–45 Saybolt seconds at 98.9° C., and the like. Mixtures of plasticizing materials may be incorporated in the resin. The amount of plasticizing material incorporated in the resin of the present invention may vary widely depending upon the particular plasticizer selected, e.g., whether or not the plasticizer itself possesses film-forming properties, and upon the particular properties desired in the plasticized product. Generally, however, when a plasticizer is employed, it is present in an amount of at least about 1%, and preferably at least about 2%, by weight, of the resin. Amounts of plasticizer as high as about 100%, by weight, based on the weight of the resin, may be used in certain instances, although in most cases the plasticizer will not exceed about 50%, and when the plasticizing material itself does not possess film-forming properties it preferably does not exceed about 15%.

Moreover, to the resin of the present invention, with or without a plasticizer as discussed above, there may be added fillers in accordance with known practice. Fillers, as is known in the resin art, are finely divided (including fibrous) solid materials which serve to extend the resinous product and to modify its physical properties, for example, by increasing tensile and compressive strength and by reducing shrinkage. Examples of fillers that are particularly applicable in connection with the resin of the present invention are carbon flour, silica, mica, asbestos, lime, magnesia, paper pulp, wood flour, and the like, powdered metals such as powdered iron, copper, lead, aluminum, stainless steel, and the like. Mixtures of different filling materials may be employed. The amount of filler incorporated in the product of the invention may also vary depending upon the nature of the particular filler, for example, its particle size, wetting characteristics, and the like, and upon the properties desired in the product. Generally, however, the amount of filler incorporated in the resin will not exceed about 300%, by weight, based on the weight of the resin. While the amount of filler may be any amount less than this, when a filler is employed it is generally in an amount of at least 10% based on the weight of the resin.

Relatively small amounts of the resin of the present invention may also be added to various materials in order to impart novel properties thereto. For example, by mixing from about 5% to about 25% of the resin of the present invention with Portland cement and water, the cement thus produced possesses increased acid- and water-resistance as compared to regular Portland cement. Such a cement can be employed in place of costly acid-proof resin cements in applications where the set cement will come in contact with acid. In addition, minor proportions of the resin of the present invention may be mixed with other resins to alter the properties thereof. For example, by mixing from about 5% to about 50% of the resin with a thermoplastic resin, such as polyvinyl formal, the hardness and melting point of the thermoplastic resin can be increased; and the resin of the invention may be mixed with another convertible resin, such as an epichlorohydrin bisphenol resin to modify the properties of the latter.

The novel product of the present invention and its preparation will be more clearly understood from a consideration of the following specific examples which are given for purposes of illustration only and at not intended to limit the scope of the invention in any way:

*Example I*

Crude furacrolein is prepared by mixing 200 parts of furfural and 132 parts of acetaldehyde in water containing 4 parts of commercial 83% sodium hydroxide. The reaction is exothermic and cooling means are employed to maintain the temperature below 100° F. After six to eight hours, the mixture is neutralized and the aqueous layer is removed.

A resin is prepared from the resulting crude furacrolein by mixing therewith 220 parts of 37% formaldehyde, 60 parts of furfural and 5 parts of 20° Bé. hydrochloric acid. The mixture is warmed until reaction commences. After the reaction mixture reaches the boiling point, it is refluxed for forty minutes with agitation. Agitation is then stopped and the resin formed sinks as a separate layer in the reaction vessel. To the aqueous layer is added about 2.5 parts of commercial 33% sodium hydroxide. This brings the pH of the resin to 4.5–5.5. The water layer is then removed from the resin layer.

To about 100 parts of the resin is added 1 part of diethylenetriamine. The thus catalyzed resin is converted within about 48 hours at ordinary room temperature to a hard, brittle mass which is insoluble and infusible. At slightly elevated temperatures, e. g., 100° F., the resin is converted in about 2 hours into the insoluble, infusible state.

Such resin is useful as a coating material, an impregnant or laminating adhesive for materials such as concrete, magnesia block, pulp, paper, asbestos sheet, textile fabrics, glass fabrics, and the like. A laminated product prepared from such resin has been found to be of especial utility for making ducts to carry corrosive fumes.

To another 100 parts of the resin is added 2 parts of paratoluene sulfonic acid. The thus catalyzed resin is converted in about 3 hours at 200° to the insoluble, infusible state.

To another 95 parts of the resin is added 5 parts of polyvinyl formal. With the resulting plasticized resin is mixed 165 parts of a mix consisting of 90% carbon flour, 8% lime and 2% diethylenetriamine. The resulting composition is useful as a cement which will bond to metal, concrete, bricks, and the like, even in the presence of water; and which, when converted to the insoluble, infusible state, is resistant to acids, alkalis and solvents.

*Example II*

Crude furacrolein prepared as described in Example I is steam distilled in order to provide relatively pure furacrolein crystals.

100 parts of the pure furacrolein is mixed with 100 parts of 37% formaldehyde, 5 parts of furfural and 6.7 parts of 20° Bé. hydrochloric acid. The mixture is refluxed for ninety minutes. The pH of the resin is adjusted to 4.5–5.5, and the water layer removed.

The resulting resin can be converted to the insoluble, infusible state at moderate temperatures with either an acid or alkaline catalyst.

To 20 parts of the resulting resin is added 5 parts of fine mica and 2 parts of diethylenetriamine. The resulting composition is particularly useful as a coating composition for application to metal, concrete, bricks, and the like, and will bond to surfaces even when immersed in water.

*Example III*

A resin is prepared as described in Example I. After adjustment of the pH of the resin to 4.5–5.5, it is distilled under a vacuum of 50 mm. of mercury. The temperature of the resin increases from 72° F. to 197° F. during the course of the distillation. The resulting resin possesses properties similar to that of the resin produced in accordance with Example II.

A coating composition comprising this resin is prepared by dissolving 10 parts of polyvinyl formal in 162 parts of the resin and adding 30 parts of carbon flour and 2 parts of paratoluene sulfonic acid. In place of the paratoluene sulfonic acid, 6 parts of lime may be added to the resin to provide an alkaline-catalyzed coating composition that may be used in connection with materials reactable with acid, and which is convertible to the insoluble, infusible state at room temperatures.

*Example IV*

A resin is prepared as described in Example I. After adjustment of the pH of the resin to 4.5–5.5, it is heated at 210° F. for 5 hours. The resulting resin has properties similar to the resin prepared in accordance with Example II.

A coating composition comprising this resin is prepared by dissolving 3 parts of polyvinyl formal in 172.5 parts of the resin and adding 25 parts of fine mica and 2.5 parts of 85% orthophosphoric acid.

Considerable modification is possible in the selection of materials, and proportions thereof, as well as in the particular procedures employed in preparing the resin without departing from the scope of the present invention.

We claim:

1. As a novel resin the condensation product of furacrolein, furfural and formaldehyde, the mol ratio of furacrolein to furfural being between about 1 to 1 and about 10 to 1, and the mol ratio of furacrolein plus furfural to formaldehyde being between about 0.5 to 1 and about 1.6 to 1.

2. As a novel resin the condensation product of furacrolein, furfural and formaldehyde, the mol ratio of furacrolein to furfural being between about 1.5 to 1 and about 7 to 1, and the mol ratio of furacrolein plus furfural to formaldehyde being between about 0.6 to 1 and about 1.4 to 1.

3. As a novel resin the condensation product of furacrolein, furfural and formaldehyde, the mol ratio of furacrolein to furfural being between about 2 to 1 and about 3 to 1, and the mol ratio of furacrolein plus furfural to formaldehyde being between about 0.8 to 1 and about 1 to 1.

4. A novel resinous composition comprising a mixture of the condensation product of furacrolein, furfural and formaldehyde, the mol ratio of furacrolein to furfural being between about 1 to 1 and about 10 to 1 and the mol ratio of furacrolein plus furfural to formaldehyde being between about 0.5 to 1 and about 1.6 to 1, and a plasticizer.

5. A novel resinous composition comprising a mixture of the condensation product of furacrolein, furfural and formaldehyde, the mol ratio of furacrolein to furfural being between about 1 to 1 and about 10 to 1 and the mol ratio of furacrolein plus furfural to formaldehyde being between about 0.5 to 1 and about 1.6 to 1, and a filler.

6. A novel resinous composition comprising a mixture of the condensation product of furacrolein, furfural and formaldehyde, the mol ratio of furacrolein to furfural being between about 1 to 1 and about 10 to 1 and the mol ratio of furacrolein plus furfural to formaldehyde being between about 0.5 to 1 and about 1.6 to 1, a plasticizer and a filler.

7. The method of making a novel resin which comprises condensing, in an acid, aqueous medium, furacrolein, furfural and formaldehyde, the mol ratio of furacrolein to furfural being between about 1 to 1 and about 10 to 1, and the mol ratio of furacrolein plus furfural to formaldehyde being between about 0.5 to 1 and about 1.6 to 1.

8. The method of claim 7 wherein the mol ratio of furacrolein to furfural is between about 1.5 to 1 and about 7 to 1, and wherein the mol ratio of furacrolein plus furfural to formaldehyde is between about 0.6 to 1 and about 1.4 to 1.

9. The method of claim 7 wherein the mol ratio of furacrolein to furfural is between about 2 to 1 and about 3 to 1, and wherein the mol ratio of furacrolein plus furfural to formaldehyde is between about 0.8 to 1 and about 1 to 1.

10. The method of making a novel resin which comprises condensing furacrolein, furfural and formaldehyde in an aqueous medium having a pH of less than about 4, the mol ratio of furacrolein to furfural being between about 1 to 1 and about 10 to 1 and the mol ratio of furacrolein plus furfural to formaldehyde being between about 0.5 to 1 and about 1.6 to 1, and arresting the reaction after no substantial sludge forms in a sample of the resin when cooled to 30° F., and while the resin is still in the liquid state.

11. The method of claim 10 wherein the reaction is arrested while the resin has a viscosity no greater than about 5000 centipoises when measured at 77° F.

12. The method of claim 10 wherein the reaction is arrested while the resin has a viscosity of between about 50 and about 700 centipoises when measured at 77° F.

13. The method of making a novel resin which comprises condensing, in an aqueous medium having a pH of less than about 4, furacrolein, furfural and formaldehyde, the mol ratio of furacrolein to furfural being between about 1 to 1 and about 10 to 1 and the mol ratio of furacrolein plus furfural to formaldehyde being between about 0.5 to 1 and about 1.6 to 1, and arresting the reaction after no substantial sludge forms in a sample of the resin when cooled to 30° F., and while the resin is still in the liquid state, by adjusting the pH of the resin to between about 4.5 and about 5.5.

14. The method of claim 13 wherein the pH of the reaction medium is between about 1 and about 3; and wherein the pH of the resin is adjusted to between about 4.5 and about 5.5 by the removal of acid before the viscosity of the resin has exceeded about 5000 centipoises when measured at 77° F.

15. The method of claim 13 wherein the pH of the reaction medium is between about 1 and about 3; wherein the mol ratio of furacrolein to furfural is between about 1.5 to 1 and about 7 to 1; wherein the mol ratio of furacrolein plus furfural to formaldehyde is between about 0.6 to 1 and about 1.4 to 1; and wherein the pH of the resin is adjusted to between about 4.5 and about 5.5 by the addition of alkaline material while the resin has a viscosity between about 50 and about 700 centipoises when measured at 77° F.

WILLARD J. LANTZ.
JOSEPH M. WALTERS.

References Cited in the file of this patent

UNITED STATES PATENTS

| Number | Name | Date |
|---|---|---|
| 2,363,829 | Caplan | Nov. 28, 1944 |
| 2,527,714 | Dunlop | Oct. 31, 1950 |